US011459968B2

(12) United States Patent
Hotta et al.

(10) Patent No.: US 11,459,968 B2
(45) Date of Patent: Oct. 4, 2022

(54) ENGINE MISFIRE DETECTION DEVICE FOR HYBRID ELECTRIC VEHICLE

(71) Applicant: TOYOTA JIDOSHA KABUSHIKI KAISHA, Toyota (JP)

(72) Inventors: Shintaro Hotta, Sunto-gun Shizuoka-ken (JP); Yuya Takahashi, Mishima (JP); Hiroki Iguma, Sunto-gun Shizuoka-ken (JP); Hideto Wakabayashi, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/522,239

(22) Filed: Nov. 9, 2021

(65) Prior Publication Data
US 2022/0145820 A1 May 12, 2022

(30) Foreign Application Priority Data

Nov. 12, 2020 (JP) .............................. JP2020-188756

(51) Int. Cl.
*F02D 41/14* (2006.01)
*F02D 29/06* (2006.01)
(Continued)

(52) U.S. Cl.
CPC ......... *F02D 41/1498* (2013.01); *F02D 29/06* (2013.01); *F02D 41/009* (2013.01);
(Continued)

(58) Field of Classification Search
CPC ............... F02D 41/1498; F02D 41/009; F02D 41/0097; F02D 29/06; F02D 2200/101; G01M 15/11
(Continued)

(56) References Cited

U.S. PATENT DOCUMENTS 7,849,733 B2 * 12/2010 Suzuki ................ F02D 41/1497
73/114.04
7,937,992 B2 * 5/2011 Akimoto ................. B60L 50/61
73/114.03
(Continued)

FOREIGN PATENT DOCUMENTS

JP 2000248989 A 9/2000
JP 2001268711 A 9/2001
JP 2011052698 A 3/2011

*Primary Examiner* — Hai H Huynh
(74) *Attorney, Agent, or Firm* — Dinsmore & Shohl LLP

(57) ABSTRACT

An engine misfire detection device is mounted on a hybrid electric vehicle that includes an internal combustion engine and a generator. The internal combustion engine has a plurality of cylinders and a crankshaft and is dedicated to power generation. The generator is connected to the crankshaft via a torsional damper. The engine misfire detection device includes a generator rotation angle sensor and a processor. The generator rotation angle sensor detects the rotation angle of the generator rotating shaft. The processor is configured to execute a misfire detection process. The misfire detection process includes a first misfire detection process of determining that the internal combustion engine has misfired when an amplitude correlation value that correlates with the magnitude of amplitude of rotation speed of the generator rotating shaft and is detected by the generator rotation angle sensor is greater than a determination threshold value.

4 Claims, 10 Drawing Sheets

(51) Int. Cl.
*F02D 41/00* (2006.01)
*G01M 15/11* (2006.01)

(52) U.S. Cl.
CPC ......... *F02D 41/0097* (2013.01); *G01M 15/11* (2013.01); *F02D 2200/101* (2013.01)

(58) Field of Classification Search
USPC ................ 123/435, 436, 406.14, 406.27; 701/103–105, 110–111; 73/114.02, 73/114.04, 114.22
See application file for complete search history.

(56) References Cited

U.S. PATENT DOCUMENTS

| | | | |
|---|---|---|---|
| 8,855,888 B2 * | 10/2014 | Suzuki | ................... F02D 29/00 701/99 |
| 2010/0152991 A1 | 6/2010 | Suzuki | |
| 2017/0355376 A1 | 12/2017 | Guo et al. | |
| 2019/0293519 A1 | 9/2019 | Ota et al. | |

* cited by examiner

Hybrid Electric Vehicle X
(Comparative Example)

Series Hybrid Electric Vehicle 1
(First Embodiment)

ENGINE MISFIRE DETECTION DEVICE FOR HYBRID ELECTRIC VEHICLE

CROSS-REFERENCE TO RELATED APPLICATION

The present disclosure claims priority under 35 U.S.C. § 119 to Japanese Patent Application No. 2020-188756, filed on Nov. 12, 2020, which is incorporated herein by reference in its entirety.

BACKGROUND

Technical Field

The present disclosure relates to an engine misfire detection device for a hybrid electric vehicle, and more particularly to an engine misfire detection device for a hybrid electric vehicle including an internal combustion engine dedicated to power generation.

Background Art

JP 2011-052698 A discloses a misfire determination device for an internal combustion engine. This internal combustion engine is mounted on a power split hybrid electric vehicle. Also, the internal combustion engine is connected to a subsequent stage (mainly, power split device and two motor generators (MG1 and MG2)) via a torsional damper. When the engine operating state does not belong to a resonance region of the subsequent stage including the damper, the misfire determination device determines a misfire by using the normal misfire detection process (firs method). On the other hand, when the engine operating state belongs to the resonance region of the subsequent stage including the damper, the misfire determination device determines a misfire by using a resonance region misfire detection process (second method) which is different from the normal misfire detection process. Both of these first and second methods are misfire detection methods based on engine rotation fluctuations.

Moreover, JP 2000-248989 A discloses a technique in which fuel cut is performed for all cylinders continuously for a predetermined period of time, and the misfire cylinder is then identified while releasing the fuel cut one by one in order. Furthermore, JP 2001-268711 A discloses a technique for feedback controlling the output of a motor generator such that engine speed becomes constant when the engine is rotated with a constant engine torque in order to check the operation of devices of the engine accurately and easily.

SUMMARY

It is known that, in a series hybrid electric vehicle equipped with an internal combustion engine dedicated to power generation (the same applies to a range extender electric vehicle), a torsional damper is interposed between the internal combustion engine and a generator. In this kind of series configuration, the inertia of one or more rotating elements located on the non-engine side with respect to the torsional damper (that is, the side of the generator or an electric motor) is small than that of a configuration in which the internal combustion engine is connected to wheels of the vehicle together with an electric motor for traveling the vehicle (for example, a power split configuration described in JP 2011-052698 A, or a parallel configuration). As a result, depending on the engine speed when a continuous misfire occurs in one specific cylinder, the engine rotation fluctuation is less likely to occur due to the influence of the anti-resonance point. Because of this, in the internal combustion engine dedicated to power generation mounted on the series hybrid electric vehicle, it may be difficult to properly detect the continuous misfire by the conventional method using engine rotation fluctuation (i.e., crankshaft rotation fluctuation). Therefore, improvement of the misfire detection method is required.

The present disclosure has been made in view of the problem described above, and an object of the present disclosure is to provide an engine misfire detection device that can improve the detection accuracy of continuous misfire in an internal combustion engine dedicated to power generation mounted on a hybrid electric vehicle.

An engine misfire detection device according to the present disclosure is mounted on a hybrid electric vehicle that includes: an internal combustion engine having a plurality of cylinders and a crankshaft and dedicated to power generation; and a generator having a generator rotating shaft connected to the crankshaft via a torsional damper. The engine misfire detection device includes: a generator rotation angle sensor configured to detect a rotation angle of the generator rotating shaft; and a processor configured to execute a misfire detection process of detecting a misfire of the internal combustion engine. The misfire detection process includes a first misfire detection process of determining that the internal combustion engine has misfired when an amplitude correlation value that correlates with a magnitude of amplitude of rotation speed of the generator rotating shaft and is detected by the generator rotation angle sensor is greater than a determination threshold value.

The engine misfire detection device may further include a crank angle sensor. The misfire detection process may include a second misfire detection process of detecting a misfire of the internal combustion engine based on a rotation fluctuation of the crankshaft detected by the crank angle sensor. The processor may be configured to: select the first misfire detection process when a half frequency value of engine rotation frequency associated with rotation speed of the crankshaft detected by the crank angle sensor is equal to or less than a specific frequency value; and select the second misfire detection process when the half frequency value is greater than the specific frequency value. The specific frequency value may be a value of frequency when a gain of a transfer function being a ratio of rotation angle displacement of the crankshaft to torque of the internal combustion engine is equal to a gain of a transfer function being a ratio of rotation angle displacement of the generator rotating shaft to the torque of the internal combustion engine.

The processor may be configured to select the first misfire detection process in an engine operating condition in which the half frequency value is equal to or less than the specific frequency value and an ignition timing of the internal combustion engine is retarded from an optimum ignition timing.

The processor may be configured to execute the first misfire detection process during a fast idle operation immediately after a cold start of the internal combustion engine.

The amplitude correlation value may be a magnitude of total amplitude of the rotation speed of the generator rotating shaft.

In a series hybrid electric vehicle (the same applies to a range extender electric vehicle) in which the inertia of one or more rotating elements located on the side of the generator with respect to the torsional damper is small, there is an engine speed range (for example, corresponding to low frequency band B1 shown in FIG. 10 described below) in which the rotation fluctuation of the generator rotating shaft is more likely to occur than the rotation fluctuation of the crankshaft due to the influence of the resonance of the torsional damper when a continuous misfire occurs in one specific cylinder. According to the first misfire detection process according to the present disclosure, when the amplitude correlation value that correlates with the magnitude of the amplitude of the rotation speed of the generator rotating shaft is greater than the determination threshold value, it is determined that the internal combustion engine has misfired. As a result, the accuracy of detecting continuous misfire can be improved by a simple method while using the engine speed range described above.

DETAILED DESCRIPTION

It is to be understood that even when the number, quantity, amount, range or other numerical attribute of an element is mentioned in the following embodiments described below, the present disclosure is not limited to the mentioned numerical attribute unless explicitly described otherwise, or unless the present disclosure is explicitly specified by the numerical attribute theoretically.

1. First Embodiment 1-1. Configuration of Hybrid Electric Vehicle

Figure 1:
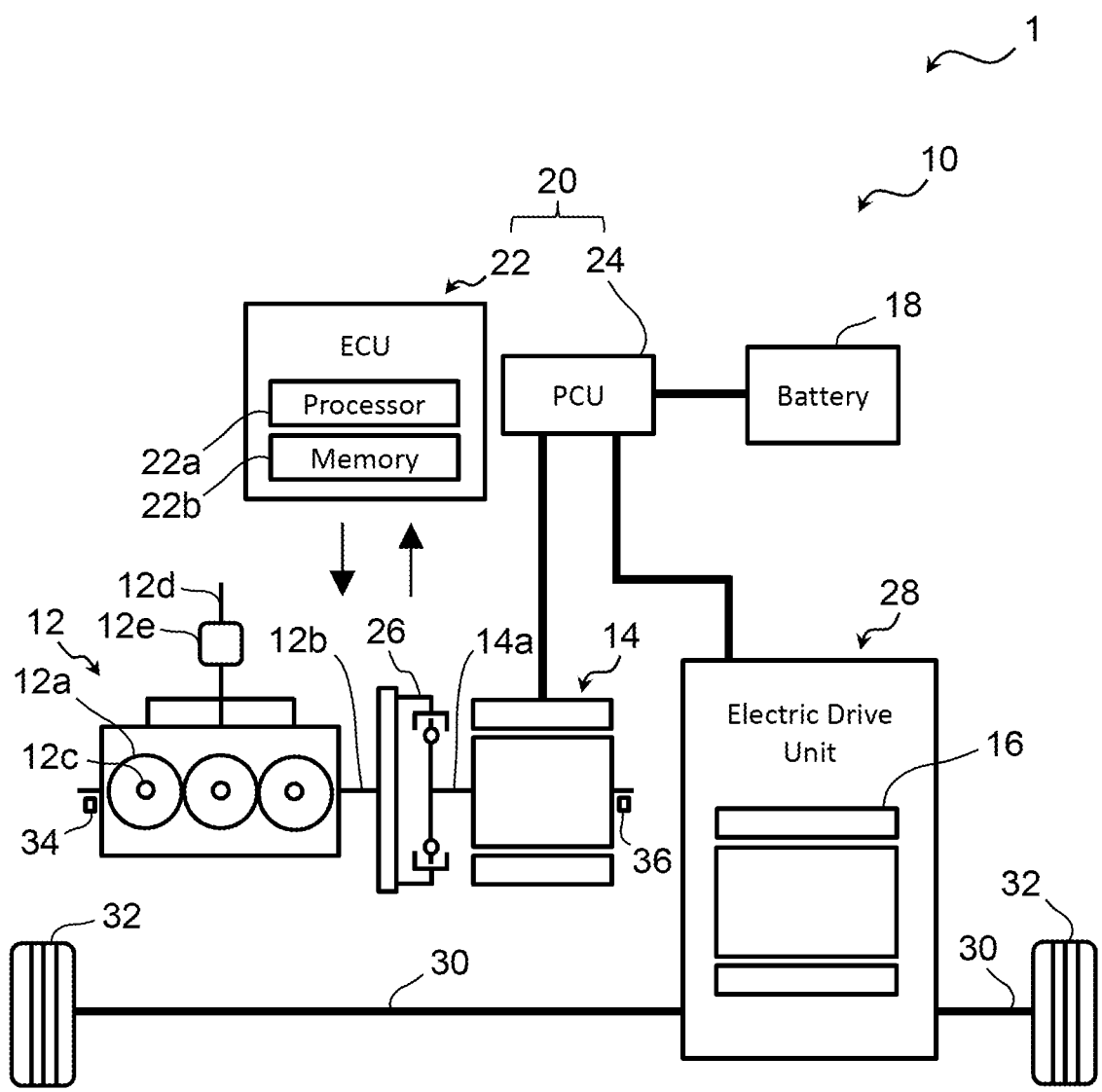
FIG. 1 is a schematic diagram showing an example of a configuration of a hybrid electric vehicle according to a first embodiment of the present disclosure.

FIG. 1 is a schematic diagram showing an example of a configuration of a hybrid electric vehicle 1 according to a first embodiment. More specifically, FIG. 1 depicts a power train system 10 included in the hybrid electric vehicle 1. The power train system 10 includes an internal combustion engine 12, a first motor generator (first MG) 14, a second motor generator (second MG) 16, a battery 18, and a control device 20.

The first MG 14 and MG 16 are, for example, three-phase AC (alternating current) motor generators. The battery 18 stores electric power supplied to the first MG 14 and second MG 16. The control device 20 is configured to control the internal combustion engine 12, the first MG 14, and the second MG 16. The control device 20 includes an electronic control unit (ECU) 22 and a power control unit (PCU) 24. The PCU 24 is a power converter including inverters for driving the first MG 14 and the second MG 16, and controls the first MG 14 and the second MG 16 based on commands from the ECU 22.

The internal combustion engine 12 is a spark ignition engine as an example. The internal combustion engine 12 includes a plurality of (as an example, three) cylinders 12a (i.e., the first to third cylinders #1 to #3) and a crankshaft 12b. The crankshaft 12b is shared by the three cylinders 12a. The crankshaft 12b is connected to a rotating shaft 14a of the first MG 14 via a torsional damper 26. Moreover, the internal combustion engine 12 includes an ignition device 12c (only spark plugs arranged in each cylinder 12a are shown). The ECU 22 can change the ignition timing by controlling the ignition device 12c. Furthermore, an exhaust gas purifying catalyst 12e is arranged in an exhaust gas passage 12d of the internal combustion engine 12.

The first MG 14 mainly functions as a generator. Specifically, the first MG 14 performs power generation using the motive power of the internal combustion engine 12. Because of this, the first MG 14 and its rotating shaft 14a correspond to examples of the "generator" and the "generator rotating shaft" according to the present disclosure, respectively. The PCU 24 converts the electric power generated by the first MG 14 from alternating current (AC) to direct current (DC) and stores the electric power in the battery 18. As a result, the battery 18 is charged. The first MG 14 also functions as an electric motor at the time of engine start. Specifically, the PCU 24 converts the electric power stored in the battery 18 from DC to AC and supplies the electric power to the first MG 14, and the first MG 14 cranks the internal combustion engine 12. However, the "generator" according to the present disclosure may have only a function as a generator using the motive power of the internal combustion engine 12.

The second MG 16 is housed in an electric drive unit 28 together with gears (not shown) such as differential gears. The second MG 16 mainly functions as an electric motor to drive the hybrid electric vehicle 1. Specifically, the PCU 24 converts the electric power stored in the battery 18 from DC to AC and supplies the electric power to the second MG 16, and the second MG 16 generates a torque for driving drive shafts 30 and wheels 32 connected thereto. As a result, the hybrid electric vehicle 1 (wheels 32) are driven.

The internal combustion engine 12 is connected to the first MG 14 as described above, but is not connected to the drive shafts 30. That is, the internal combustion engine 12 is an engine dedicated to power generation, and is started to generate electric power. In addition, not only the internal combustion engine 12 but also the first MG 14 is not connected to the drive shafts 30.

The ECU 22 includes a processor 22a and a memory 22b. The memory 22b stores various data including maps and various control programs used for various processes and controls of the internal combustion engine 12, the first MG 14, and the second MG 16. When the processor 22a receives the control program from the memory 22b and executes it, various processes and controls by the control device 20 are realized. It should be noted that the control device 20 may be configured using a plurality of ECUs. Specifically, the control device 20 may individually include, for example, an ECU that controls the power train system 10 in an integrated manner, an ECU that controls the internal combustion engine 12, an ECU that controls the first MG 14, and an ECU that controls the second MG 16.

Further, the control device 20 (ECU 22) receives sensor signals from sensors for controlling the operation of the power train system 10. The sensors include a crank angle sensor 34 configured to detect the rotation angle (crank angle) of the crank shaft 12b, and a resolver (generator rotation angle sensor) 36 configured to detect the rotation angle of the rotating shaft 14a of the first MG 14. The processor 22a can calculate the engine speed Ne on the basis of the signal of the crank angle sensor 34, and the processor 22a can calculate the rotation speed of the rotating shaft 14a (hereinafter, referred to as "MG rotation speed Nmg") on the basis of the signal of the resolver 36.

The hybrid electric vehicle 1 equipped with the power train system 10 is a so-called series hybrid electric vehicle. Also, the hybrid electric vehicle to which the present disclosure is applied may be a series plug-in hybrid electric vehicle in which an external charging function is added to the power train system 10. Further, the vehicle to which the present disclosure is applied may be a so-called range extended electric vehicle. This kind of range extended electric vehicle can be configured, for example, by using the basic configuration of the power train system 10 shown in FIG. 1, adding the external charging function, and increasing the capacity of the battery 18.

1-2. Misfire Detection Process

The processor 22a included in the ECU 22 shown in FIG. 1 corresponds to an example of "the processor included in the engine misfire detection device" according to the present disclosure. The processor 22a is configured to execute a misfire detection process that detects a misfire of the internal combustion engine 12. In the first embodiment, a "misfire detection process A" described below that corresponds to an example of the "first misfire detection process" according to the present disclosure is executed as the misfire detection process.

The patterns of misfires that occur in the internal combustion engine 12 include "continuous misfire" in which one specific cylinder continuously misfires over a plurality of cycles, and "random misfire" in which misfire occurs discontinuously and randomly for a plurality of cylinders. A misfire detection process A described below has a high misfire detectability in detecting continuous misfire of the internal combustion engine 12, which is dedicated to power generation mounted on the series hybrid electric vehicle 1. However, this misfire detection process A can also be used to detect random misfire.

1-2-1. Issue Related to Detection of Continuous Misfire in Series Hybrid Electric Vehicle In the series hybrid electric vehicle 1, the inertia Img of the rotating elements located on the non-engine side (i.e., the side of the first MG 14) with respect to the torsional damper 26 is smaller than that of a hybrid electric vehicle of another type (e.g., power split type or parallel type). The vibration mode changes depending on the difference between these types. As a result, depending on the engine speed Ne when a continuous misfire occurs, the engine rotation fluctuation (i.e., rotation fluctuation of the crankshaft 12b) is less likely to occur due to the influence of the anti-resonance point of a power transmission system P (see FIG. 3 described below) from the internal combustion engine 12 to the first MG 14 via the torsional damper 26. Because of this, in the internal combustion engine 12 dedicated to power generation mounted on the series hybrid electric vehicle 1, a situation may occur in which it is difficult to properly detect continuous misfire by a general method using the engine rotation fluctuation. Therefore, improvement of misfire detection method is required.

Next, the above-described issue and the findings obtained therefrom will be described in detail while comparing a hybrid electric vehicle X with the series hybrid electric vehicle 1. The hybrid electric vehicle X is an example of the above-described another type hybrid electric vehicle, and is the power split type as described in JP 2011-052698 A. Also, as an example of the engine operating condition in which the above-described issue remarkably occurs, there is a fast idle operating condition with a retard of the ignition timing. For example, the purpose of the retard of the ignition timing is to warm up a catalyst. Therefore, the following detailed description of the above-described issue will be given mainly focusing on the fast idle operating condition accompanied by this kind of catalyst warm-up. It should be noted that the fast idle operation is an engine operation (engine warm-up operation) performed while increasing the idle speed immediately after a cold start performed when engine cooling water temperature is lower than a designated value. Moreover, according to the retard of the ignition timing performed during the fast idle operation, the ignition timing is retarded from the optimum ignition timing MBT (Minimum advance for the Best Torque), for example, in order to accelerate the warm-up of the exhaust gas purifying catalyst 12e.

If no misfire has occurred, one combustion will occur in each cylinder 12a during two rotations of the crankshaft 12b. On the other hand, when a continuous misfire occurs in one specific cylinder, misfire occurs in a cycle once during two revolutions of the crankshaft 12b. As a result, a periodic fluctuation component of engine torque Te (i.e., a torque fluctuation component of the 0.5th order frequency of the engine speed Ne) caused by the influence of this continuous misfire is input to the torsional damper 26. The torque fluctuation component caused by this kind of continuous misfire is affected by the resonance of the power transmission system P and affects the rotation fluctuation of the rotating shaft 14a of the first MG 14.

Figure 2:
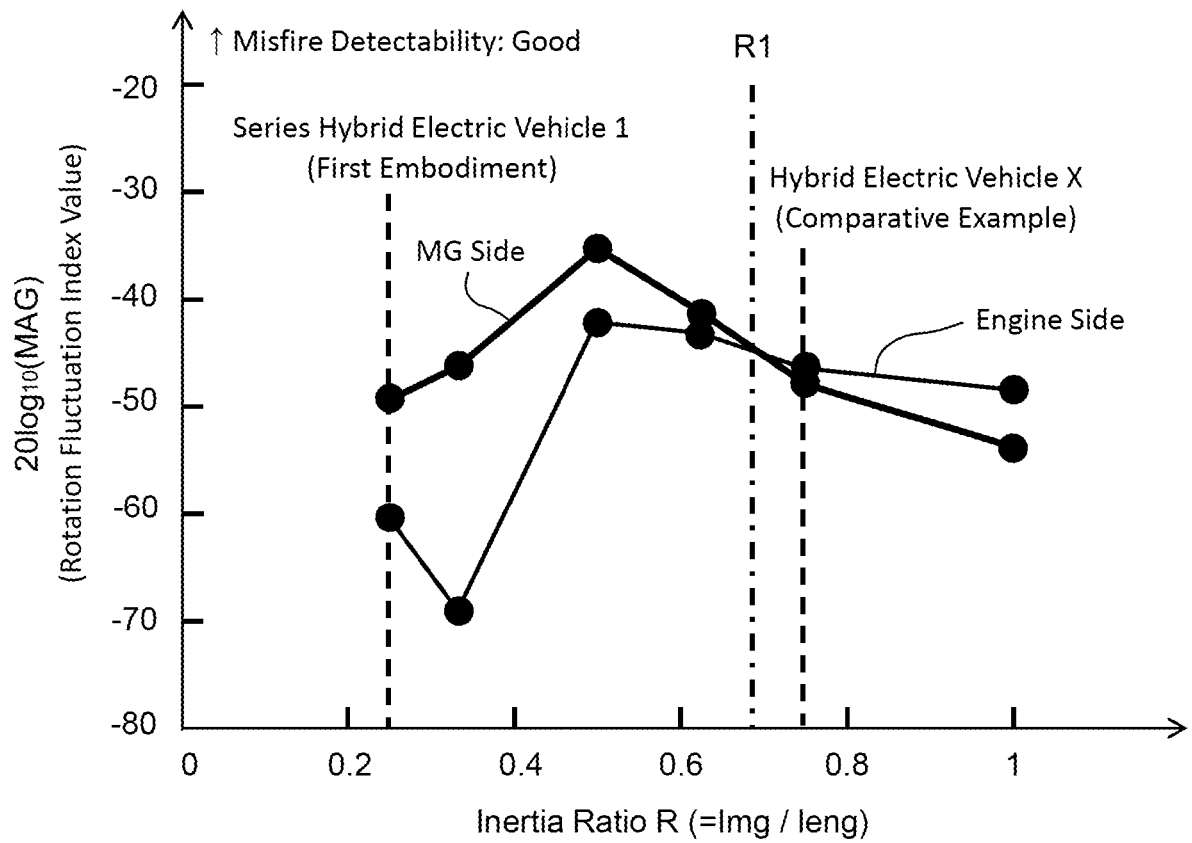
FIG. 2 is a graph showing a relation between a rotation fluctuation index value and an inertia ratio R.

FIG. 2 is a graph showing a relation between a rotation fluctuation index value and an inertia ratio R. The relation shown in FIG. 2 is determined based on the specifications of a power transmission system (more specifically, an internal combustion engine, a torsional damper, and components after the torsional damper). It should be noted that the "engine side" in FIG. 2 indicates one or more rotating elements (i.e., mainly a crankshaft and a flywheel) on the engine side with respect to the torsional damper. Also, the "MG side" indicates one or more rotating elements on the non-engine side with respect to the torsional damper. In the hybrid electric vehicle X, the rotating elements in the latter stage described above correspond to the one or more rotating elements on the non-engine side. In the series hybrid electric vehicle 1, the rotating shaft 14a of the first MG 14 corresponds to the one or more rotating elements on the non-engine side.

FIG. 2 shows a relation under a fast idle operating condition accompanied by the catalyst warm-up (for example, 1300 rpm as the engine speed Ne). 20 log 10 (MAG) on the vertical axis of FIG. 2 shows the gain of a transfer function, which is the ratio of the rotation angle displacement (output) on the engine side/MG side to the engine torque Te (input), in decibels, and is hereinafter also referred to as the "rotation fluctuation index value" for convenience. A specific example of this transfer function will be described below with reference to FIG. 3. The rotation fluctuation index value indicates that the larger the value, the more likely the rotation fluctuation is to occur due to the influence of the torsional resonance of the torsional damper when the engine torque Te (i.e., the fluctuation component) is input due to continuous misfire (in other words, the larger the value, the higher the amplitude of the rotation speed Ne or Nmg). A large amplitude of the rotation speed Ne or Nmg is favorable in order to accurately detect a misfire using the rotation fluctuation. Therefore, as shown in FIG. 2, the larger the rotation fluctuation index value, the better the misfire detection.

The inertia ratio R of the horizontal axis in FIG. 2 corresponds to the ratio of the inertia Img of the rotating elements on the "MG side" to the inertia Ieng of the rotating elements on the "engine side". In the example shown in FIG. 2, when the inertia ratio R is a designated value R1, the rotation fluctuation index values on the engine side and MG side intersect. Also, in a low inertia ratio range less than the designated value R1, the rotation fluctuation index value on the MG side exceeds that on the engine side. Therefore, in this low inertia ratio range, it is considered that high misfire detectability can be ensured by using the rotation fluctuation on the MG side. On the other hand, in a high inertia ratio range higher than the designated value R1, the rotation fluctuation index value on the engine side exceeds that on the MG side. Therefore, in this high inertia ratio range, it can be said that high misfire detectability can be ensured by using the rotation fluctuation on the engine side.

As already described, in the series hybrid electric vehicle 1, the inertia Img on the non-engine side (MG side) is small. Therefore, the inertia ratio R of the series hybrid electric vehicle 1 takes a value belonging to the low inertia ratio range such as 0.26. This is not limited to the example of the series hybrid electric vehicle 1, but can apply to series hybrid electric vehicles in general. On the other hand, in the power split hybrid electric vehicle X (the same applies to the parallel type), the inertia Img takes a value near the inertia Ieng on the engine side, and therefore, the inertia ratio R takes a value belonging to the high inertia ratio range such as 0.74.

From the relation shown in FIG. 2 described above, it can be seen that, under the fast idle operating condition accompanied by the catalyst warm-up, the detectability of continuous misfire of the internal combustion engine 12 mounted on the series hybrid electric vehicle 1 can be improved by using the rotation fluctuation on the MG side.

Figure 3:
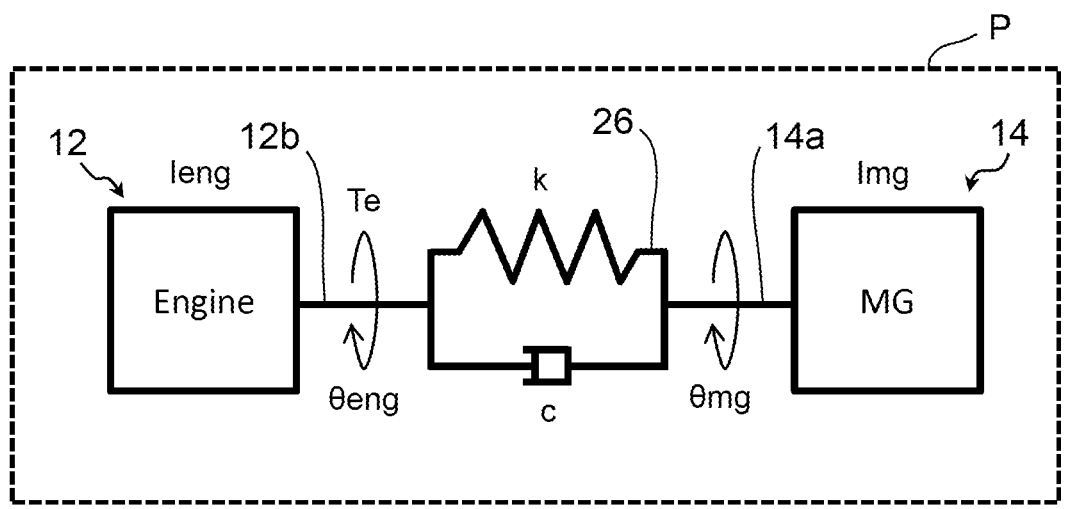
FIG. 3 is a diagram showing a model of a power transmission system P of the series hybrid electric vehicle shown in FIG. 1.

FIG. 3 is a diagram showing a model of the power transmission system P of the series hybrid electric vehicle 1. In FIG. 3, together with the internal combustion engine 12 and the first MG 14, the torsional damper 26 interposed therebetween is represented by a spring element and a damping element. In FIG. 3, Ieng and Img are the inertias of the rotating elements on the engine side and MG side, respectively, and Te is the engine torque. θeng is the crank angle, and θmg is the rotation angle of the rotating shaft 14a of the first MG 14. k is a spring constant of the spring element. c is a damping coefficient of the damping element, and takes a value of, for example, k/1000.

The equation of motion of the rotating elements on the engine side and the equation of motion of the rotating elements on the MG side can be expressed as the following Equations (1) and (2), respectively. By applying the Laplace transform to Equations (1) and (2), Equations (3) and (4) can be obtained, respectively. Equation (3) represents a transfer function showing the relation between the rotation angle displacement Xeng (output) with respect to the engine torque Te (input) on the engine-side. Equation (4) represents a transfer function showing the relation between the rotation angle displacement Xmg (output) with respect to the engine torque Te (input) on the MG side. In FIG. 2 and FIGS. 4A, 4B, and 10 described below, the transfer functions calculated in this manner are used.

$$I_{eng}\ddot{\theta}_{eng} = k(\theta_{mg} - \theta_{eng}) + c(\dot{\theta}_{mg} - \dot{\theta}_{eng}) - T_e \quad (1)$$

$$I_{mg}\ddot{\theta}_{mg} = k(\theta_{eng} - \theta_{mg}) + c(\dot{\theta}_{eng} - \dot{\theta}_{mg}) \quad (2)$$

$$\frac{X_{eng}}{T_e} = \frac{I_{mg}s^2 + cs + k}{I_{eng}I_{mg}s^4 + (I_{eng} + I_{mg})cs^3 + (I_{eng} + I_{mg})ks^2} \quad (3)$$

$$\frac{X_{mg}}{T_e} = \frac{cs + k}{I_{eng}I_{mg}s^4 + (I_{eng} + I_{mg})cs^3 + (I_{eng} + I_{mg})ks^2} \quad (4)$$

Figure 4A:
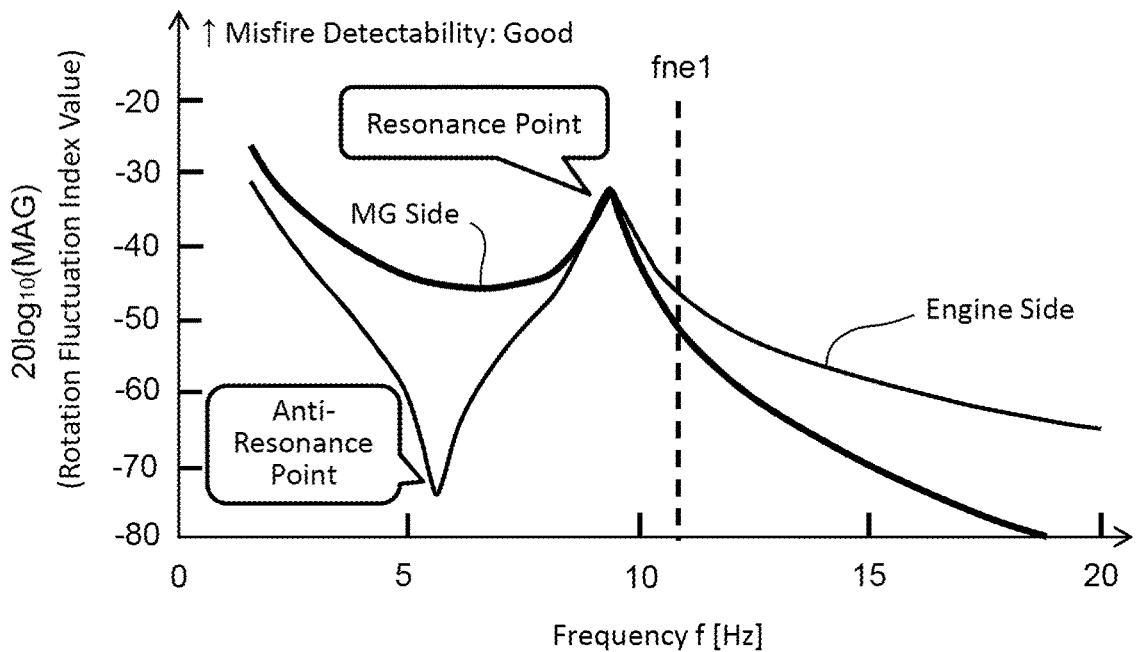
FIG. 4A is a graph used to describe the relation between the rotation fluctuation index value and frequency f in a hybrid electric vehicle X.
Figure 4B:
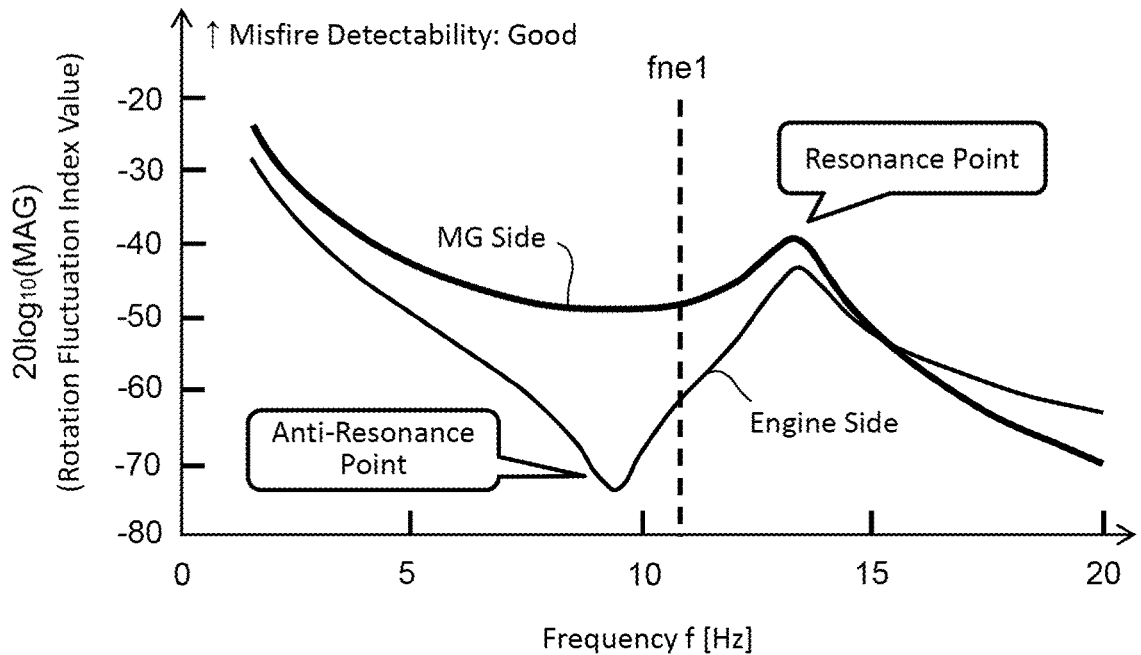
FIG. 4B is a graph used to describe the relation between the rotation fluctuation index value and the frequency f in the series hybrid electric vehicle shown in FIG. 1.

Next, FIGS. 4A and 4B are graphs used to describe the relation between the rotation fluctuation index value and the frequency f while comparing between the hybrid electric vehicle X and the series hybrid electric vehicle 1. The relation shown in FIGS. 4A and 4B is determined based on the specifications of power transmission system (internal combustion engine, torsional damper, and components after the torsional damper) as well as the relation shown in FIG. 2 described above. Also, each graph shows the resonance point and the anti-resonance point of the torsional damper (more specifically, the power transmission system). Moreover, a frequency value fne1 shown in each graph indicates 10.8 Hz, which is a 0.5th order frequency value of engine rotation frequency fne corresponding to 1300 rpm (i.e., a half frequency value of the engine rotation frequency fne). This 1300 rpm is an example of the value of the engine speed Ne (i.e., the rotation speed of the crankshaft 12b) under the fast idle operation condition accompanied by the catalyst warm-up.

FIG. 4A shows the frequency characteristics of rotation fluctuation with respect to the hybrid electric vehicle X for comparison. In the hybrid electric vehicle X in which the inertia Img on the latter stage side (MG side) of the torsional damper is larger than that of the series hybrid electric vehicle 1, the engine rotation frequency value fne1 during the fast idle operation is located on the high frequency side from the resonant point (9.4 Hz). Then, at this engine rotation frequency value fne1, the rotation fluctuation index value on the engine side exceeds that on the MG side. Therefore, for the fast idle operation in the hybrid electric vehicle X, it is appropriate to use a known misfire detection technique that utilizes the rotation fluctuation on the engine side.

On the other hand, in the series hybrid electric vehicle 1 in which the inertia Img on the MG side is much smaller than that of the hybrid electric vehicle X, the resonance point moves to the higher frequency side than that of the vehicle X as shown in FIG. 4B. As a result, the engine rotation frequency fne1 is located on the lower frequency side than the resonance point (13.4 Hz) and approaches the anti-resonance point located on the lower frequency side than the resonance point. Then, at the engine rotation frequency fne1, the rotation fluctuation index value on the engine side is smaller than that of the hybrid electric vehicle X. Because of this, the rotation fluctuation on the engine side is less likely to occur. Therefore, it can be seen that the use of the general misfire detection method using the engine rotation fluctuation is not appropriate during the fast idle operation in the series hybrid electric vehicle 1. On the other hand, at the engine rotation frequency fne1, it can be seen that the rotation fluctuation on the MG-side is likely to occur.

1-2-2. Waveforms of Engine Speed and MG Speed

Figure 5:
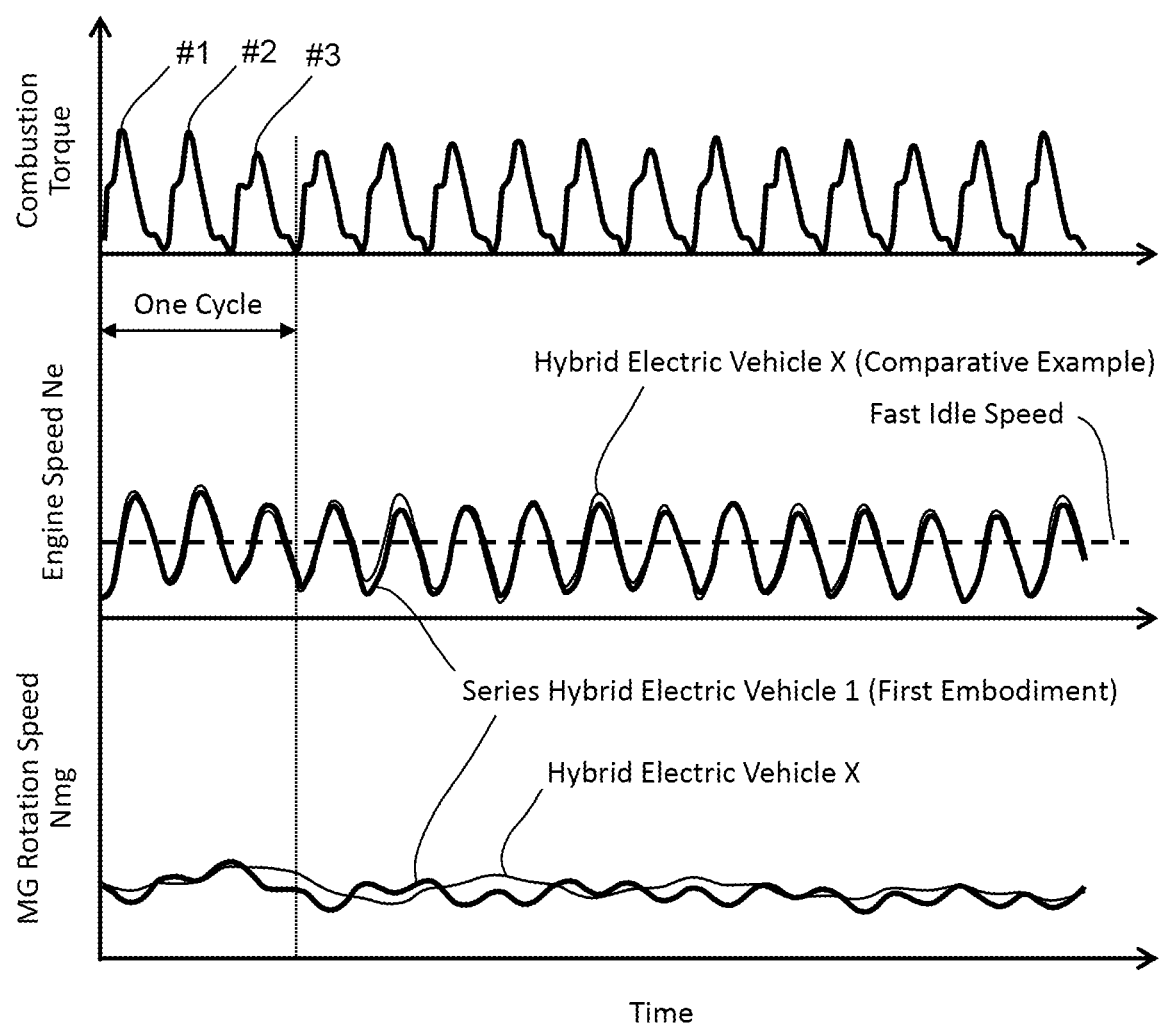
FIG. 5 is a time chart used to describe the waveforms of engine speed Ne and MG rotation speed Nmg when no misfire has occurred.
Figure 6:
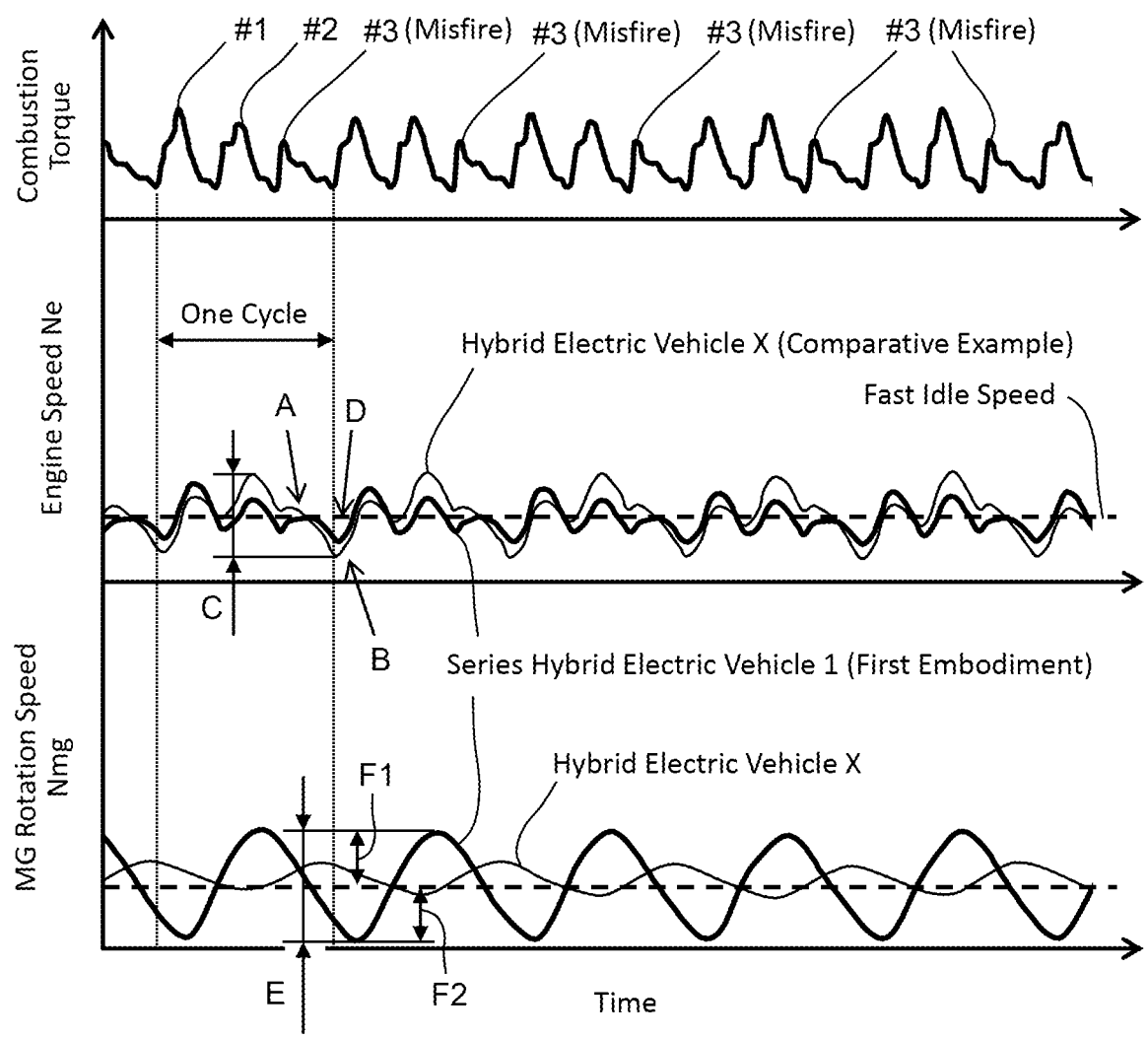
FIG. 6 is a time chart used to describe the waveforms of the engine speed Ne and MG rotation speed Nmg when a continuous misfire occurs in one specific cylinder.

Next, FIG. 5 is a time chart used to describe the waveforms of the engine speed Ne and MG rotation speed Nmg when no misfire has occurred. FIG. 6 is a time chart used to describe the waveforms of the engine speed Ne and MG rotation speed Nmg when a continuous misfire occurs in one specific cylinder. In these figures, the waveforms of the hybrid electric vehicle X referenced to for comparison are shown by thin solid lines, and the waveforms of the series hybrid electric vehicle 1 according to the first embodiment are shown by thick solid lines. In addition, these figures show the waveforms during the fast idle operation accompanied by the catalyst warm-up, and the engine speed Ne changes around a constant value (1300 rpm as an example).

First, as shown in FIG. 5, when no misfire has occurred, combustion torque (engine torque Te) is generated in the order of the first cylinder #1, the second cylinder #2, and the third cylinder #3 during one cycle. The engine speed Ne fluctuates in conjunction with this change in combustion torque. In addition, if no misfire has occurred, the engine speed Ne in the series hybrid electric vehicle 1 will fluctuate in the same manner as that in the hybrid electric vehicle X. On the other hand, there is a difference in MG rotation speed Nmg between the two. Specifically, the torque input from the engine side to the MG side is smoothed by the presence of the torsional damper, but the waveform of the MG rotation speed Nmg in the series hybrid electric vehicle 1 having a relatively small inertia Img fluctuates at a higher frequency than that of the hybrid electric vehicle X.

Next, in the example shown in FIG. 6, continuous misfire has occurred in a specific cylinder (e.g., third cylinder #3). In the hybrid electric vehicle X, as described with reference to FIG. 4, during the fast idle operation, the rotation fluctuation on the engine side (i.e., the fluctuation of the engine speed Ne) is more likely to occur than the rotation fluctuation on the MG side. Specifically, when a misfire occurs, the engine speed Ne does not increase as indicated by an arrow A in FIG. 6, and then, the engine speed Ne decreases significantly as indicated by an arrow B. This is because, in the hybrid electric vehicle X having a larger inertia Img than the series hybrid electric vehicle 1, when the combustion torque disappears due to the misfire, the engine speed Ne tends to decrease. As a result, as indicated by a symbol C, the swing width of the engine speed Ne due to the occurrence of continuous misfire increases. Therefore, in the hybrid electric vehicle X, misfire detectability can be ensured by a general method that uses the engine rotation fluctuation during the fast idle operation accompanied by the catalyst warm-up.

On the other hand, in the series hybrid electric vehicle 1, since the inertia Img on the MG side is small, as indicated by an arrow D, it is difficult for the engine speed Ne to decrease even if a misfire occurs. As a result, the swing width of the engine speed Ne due to the occurrence of continuous misfire is smaller than that of the hybrid electric vehicle X. On the other hand, it can be seen from FIG. 6 that the MG rotation speed Nmg fluctuates greatly, unlike the hybrid electric vehicle X, which does not show a large difference from the example without misfire. It should be noted that, in the example of continuous misfire shown in FIG. 6, the MG rotation speed Nmg fluctuates due to the influence of the resonance of the torsional damper (more detail, the power transmission system). Therefore, as shown in FIG. 6, the period of the MG rotation speed Nmg in the waveform of the series hybrid electric vehicle 1 having a relatively high resonance frequency (e.g., 13.4 Hz) is shorter than that in the waveform of the hybrid electric vehicle X having a relatively low resonance frequency (e.g., 9.4 Hz).

Figure 7A:
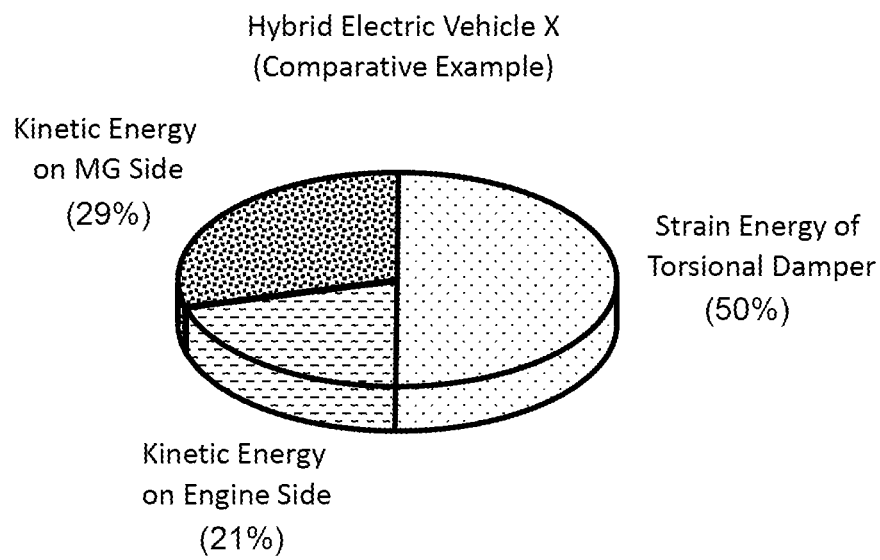
FIG. 7A is a diagram showing the energy ratio at the time of continuous misfire in the hybrid electric vehicle X.
Figure 7B:
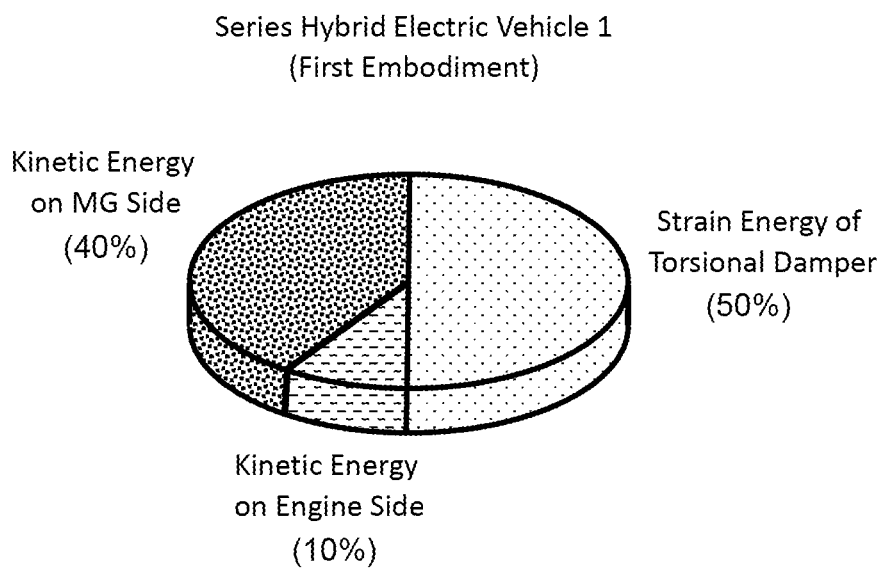
FIG. 7B is a diagram showing the energy ratio at the time of continuous misfire in the series hybrid electric vehicle shown in FIG. 1.

Next, with reference to FIGS. 7A and 7B, the analysis results of the vibration mode at the time of continuous misfire from the viewpoint of energy will be supplementarily described. FIGS. 7A and 7B are diagrams showing the difference in the energy ratio at the time of continuous misfire between the hybrid electric vehicle X and the series hybrid electric vehicle 1. The calculation result of the energy ratio shown in FIG. 7 is based on the same test data as that shown in FIG. 6. The torque output from the internal combustion engine 12 (i.e., engine torque Te) is converted into kinetic energies on the engine side and MG side and strain energy of the torsional damper.

As can be seen by comparing FIG. 7A and FIG. 7B, the ratio of strain energy of the torsional damper is the same. On the other hand, regarding the kinetic energy, in the series hybrid electric vehicle 1, the ratio of the kinetic energy on the MG side is clearly higher than the ratio of the kinetic energy on the engine side as compared with the hybrid electric vehicle X. This indicates that, in the series hybrid electric vehicle 1, when a continuous misfire occurs, the rotation fluctuation on the engine side is less likely to occur, while the rotation fluctuation on the MG side is likely to occur.

1-2-3. Outline of Misfire Detection Process A

In view of the above-described issue and findings, according to the first embodiment, the misfire detection process A using the rotation fluctuation on the MG side is executed in order to detect the misfire of the internal combustion engine 12. Specifically, in the misfire detection process A, the processor 22a determines that when an "amplitude correlation value" is greater than a designated determination threshold value, the internal combustion engine 12 has misfired.

The amplitude correlation value referred to here is a value that correlates with the magnitude of the amplitude of the MG rotation speed Nmg. A specific example of the amplitude correlation value used in the first embodiment is, for example, the total amplitude indicated by a symbol E in FIG. 6. In addition, the amplitude correlation value may be, for example, one of the amplitudes indicated by symbols F1 and F2 in the same figure (i.e., one of the half amplitudes (in other words, the difference between the maximum value and the average value, or the difference between the average value and the minimum value)). This kind of amplitude correlation value can be calculated using, for example, the output signal of the resolver 36.

Also, the misfire detection itself is basically always executed during the operation of the internal combustion engine 12. The above description has been made for the continuous misfire, focusing on the fast idle operating condition accompanied by the catalyst warm-up. However, in the first embodiment, as an example, not only the misfire detection under the fast idle operating condition but also all the misfire detections performed during the engine operation are executed by using the misfire detection process A.

More specifically, in the first embodiment, the misfire detection process A is executed regardless of the engine speed Ne used during the engine operation (in other words, regardless of the 0.5th order frequency value of the engine rotation frequency fne). Moreover, the pattern of misfire that can be detected by the misfire detection process A is not limited to the continuous misfire in which the above-described influence of the resonance is reflected on the MG rotation speed Nmg as shown in FIG. 6. That is, the misfire detection process A can also be used to detect a random misfire, which will be described below, for example, with reference to FIG. 8.

Figure 8:
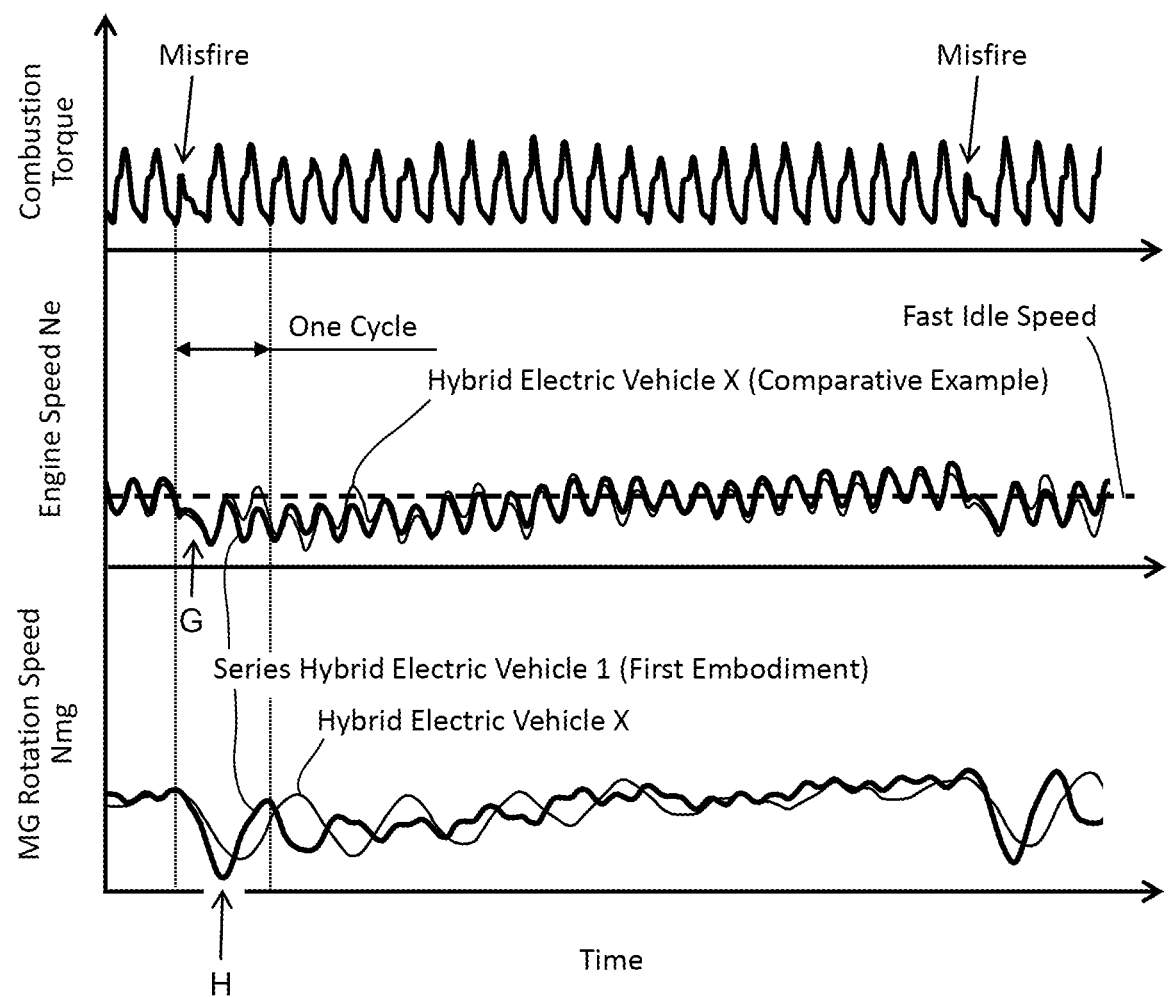
FIG. 8 is a time chart used to describe the waveforms of the engine speed Ne and MG rotation speed Nmg when a random misfire occurs.

FIG. 8 is a time chart used to describe the waveforms of the engine speed Ne and MG rotation speed Nmg when a random misfire occurs. In this figure, similarly to FIGS. 5 and 6, the waveforms of the hybrid electric vehicle X referred to for comparison are shown by thin solid lines, and the waveforms of the series hybrid electric vehicle 1 according to the first embodiment are shown by thick solid lines. Further, this figure shows waveforms during the fast idle operation accompanied by the catalyst warm-up, and the engine speed Ne changes around a constant value (1300 rpm as an example).

Even in an example of random misfire, the engine speed Ne decreases with the occurrence of a misfire as indicated by an arrow G in FIG. 8. However, in an example of a random misfire in which a single misfire occurs, the MG rotation speed Nmg is not affected by the resonance of the torsional damper (more specifically, the power transmission system). Therefore, as shown by an arrow H in the same figure, after a large rotation fluctuation occurs on the MG side due to the occurrence of a misfire, the rotation fluctuation on the MG side is immediately converging. Even in the example of random misfire in which this kind of waveform of the MG rotation speed Nmg is obtained, by acquiring the amplitude correlation value (for example, the magnitude of the total amplitude) of the MG rotation speed Nmg for a designated crank angle period (for example, 720° CA corresponding to one cycle), random misfire can be detected by using the misfire detection process A.

1-2-4. Process by Processor

Figure 9:
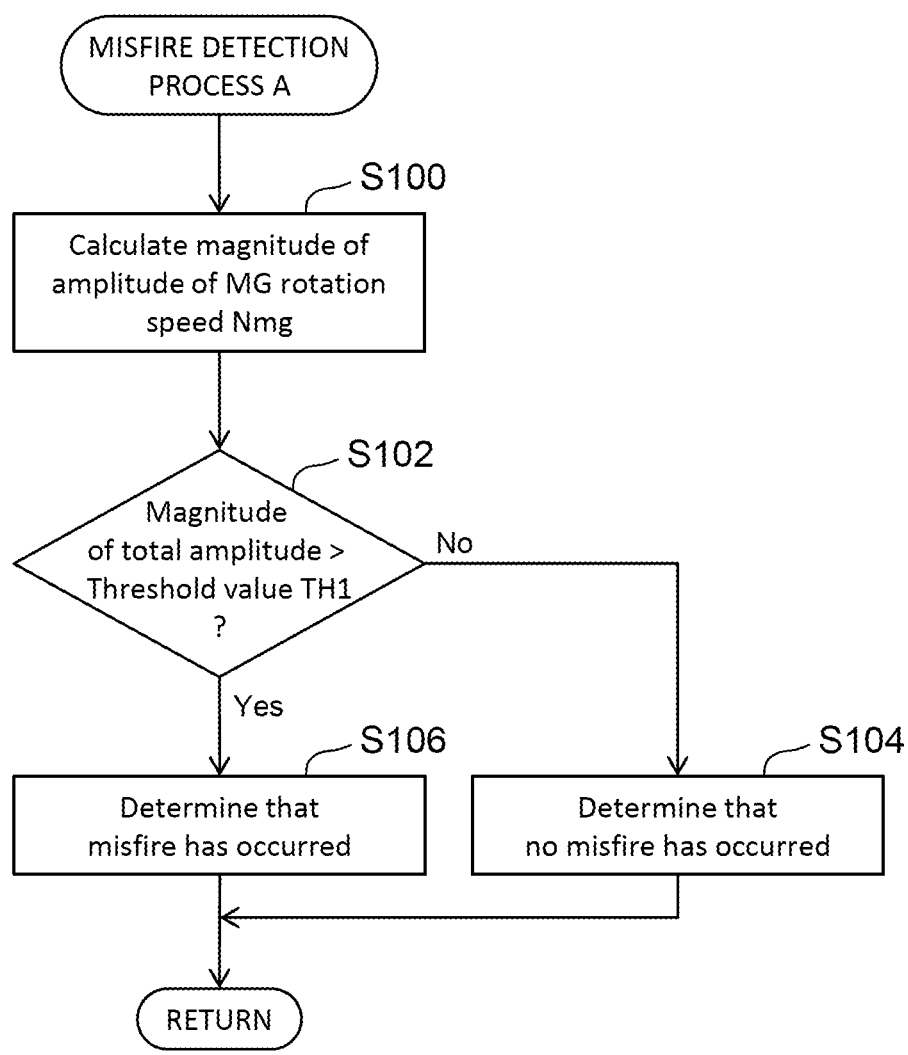
FIG. 9 is a flowchart showing the flow of a misfire detection process A according to the first embodiment.

FIG. 9 is a flowchart showing the flow of the misfire detection process A according to the first embodiment. The process of this flowchart is repeatedly executed during engine operation after the start of the internal combustion engine 12 is completed.

In FIG. 9, first, in step S100, the processor 22a calculates the magnitude of the total amplitude of the MG rotation speed Nmg. More specifically, the processor 22a calculates the magnitude of the total amplitude (amplitude correlation value) based on the data of the MG rotation speed Nmg detected by the resolver 36 during a designated crank angle period (e.g., 720° CA corresponding to one cycle) required to calculate the magnitude of the total amplitude. Thereafter, the process proceeds to step S102.

In step S102, the processor 22a determines whether or not the magnitude of the total amplitude calculated in step S100 is greater than a designated threshold value TH1. This threshold value TH1 is predetermined as a value that distinguishes the magnitude of the total amplitude when various patterns of misfires including continuous misfires occur, from the magnitude of the total amplitude when no misfire has occurred.

In step S102, when the magnitude of the total amplitude is smaller than or equal to the threshold value TH1, the process proceeds to step S104. In step S104, the processor 22a determines that no misfire has occurred in the internal combustion engine 12.

On the other hand, when the magnitude of the total amplitude is greater than the threshold value TH1, the process proceeds to step S106. In step S106, the processor 22a determines that a misfire has occurred in the internal combustion engine 12.

1-3. Effect

As described above, according to the misfire detection process A for the series hybrid electric vehicle 1 having a small inertia Img on the MG side, by using the amplitude correlation value of the rotation fluctuation on the MG side, the accuracy of detecting continuous misfire can be improved by a simple method in an engine operating condition (e.g., fast idle operating condition with catalyst warm-up) that uses a low frequency band (see FIG. 4B) in which the rotation fluctuation on the MG side is more likely to occur than the rotation fluctuation on the engine side.

In addition, in a general misfire detection method that uses the rotation fluctuation on the engine side, in order to improve the accuracy of detecting continuous misfire, a complicated process may be used to acquire the engine speed Ne excluding the torsional vibration component of the torsional damper superimposed on the engine speed Ne. On the other hand, according to the misfire detection process A that acquires the rotation fluctuation (i.e., amplitude correlation value) on the MG side by using the rotation angle sensor (resolver) 36, the rotation fluctuation that occurs in the power transmission system P due to the occurrence of continuous misfire can be directly detected. Therefore, continuous misfire can be detected accurately without using the complicated process as described above.

Moreover, in the misfire detection process A according to the first embodiment, the magnitude of the total amplitude of the MG rotation speed Nmg is used as the amplitude correlation value. As a result, as compared with the example of using the magnitude of the amplitude (more specifically, half amplitude or single amplitude), it becomes possible to compare a large amplitude correlation value with a determination threshold value. Therefore, the S/N ratio for detecting the fluctuation in the MG rotation speed Nmg due to the occurrence of misfire can be increased, and the accuracy of misfire detection can be improved.

Furthermore, when the ignition timing is retarded with respect to the optimum ignition timing MBT as in the fast idle operation accompanied by catalyst warm-up, the combustion in the cylinder 12a becomes slow. Because of this, compared to when the optimum ignition timing MBT is used, the rotation fluctuation on the engine side is less likely to occur. Therefore, when continuous misfire occurs during the fast idle operation accompanied by catalyst warm-up, the rotation fluctuation on the engine side is less likely to occur not only due to the reason described with reference to FIG. 4B, but also due to the influence of the retard of the ignition timing. That is, it becomes extremely difficult to accurately detect continuous misfire with a general misfire detection method that utilizes the rotation fluctuation on the engine side. On the other hand, according to the misfire detection process A that does not utilize the rotation fluctuation on the engine side, the detectability of continuous misfire under this kind of situation can be effectively improved. In addition, reducing the retard amount of the ignition timing in order to improve the detectability of the rotation fluctuation on the engine side during the fast idle operation accompanied by catalyst warm-up leads to an increase in the amount of exhaust emission (unburned hydrocarbon HC) because the time required for the catalyst warm-up becomes longer. On the other hand, by using the misfire detection process A, the detectability of continuous misfire can be ensured without causing this kind of decrease in the retard amount of the ignition timing.

2. Second Embodiment

A second embodiment is the same as the first embodiment described above, except that the misfire detection process is changed during the operation of the internal combustion engine 12 by the method described below.

2-1. Misfire Detection Process

Figure 10:
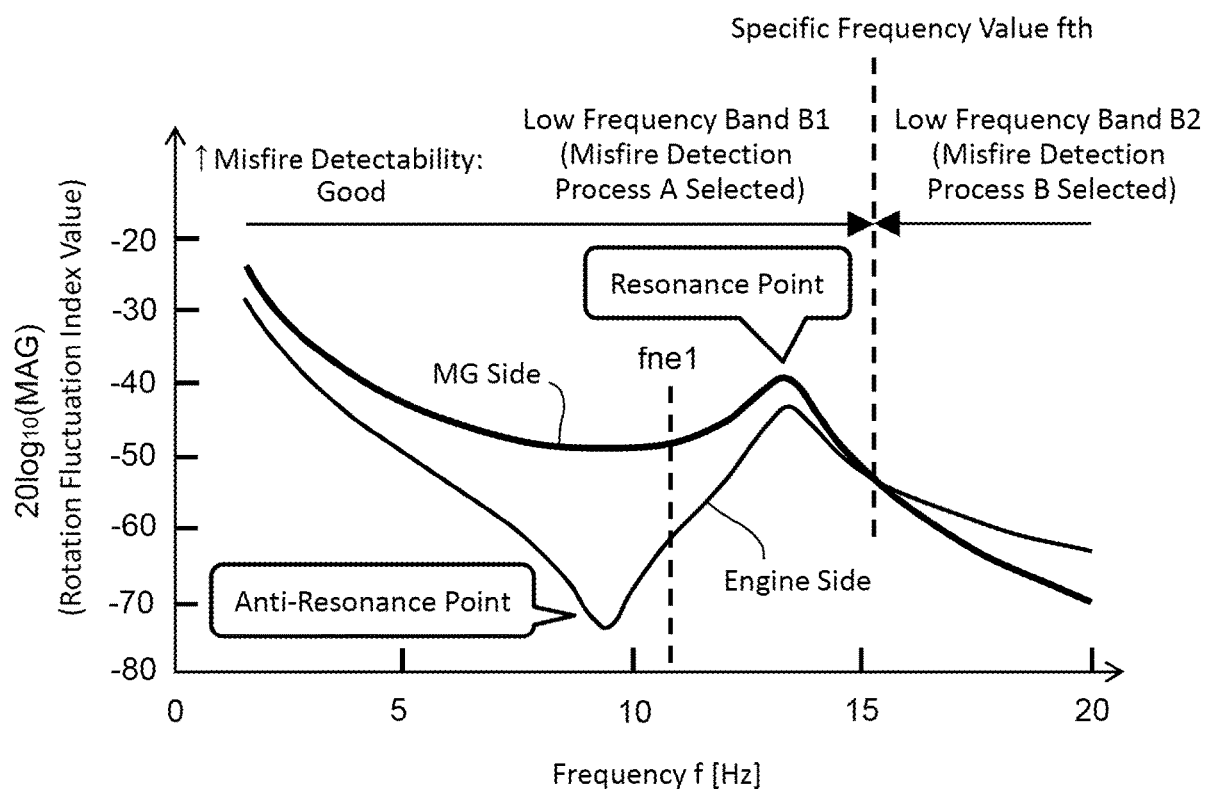
FIG. 10 is a graph used to describe a method of selecting a misfire detection process according to a second embodiment of the present disclosure.

FIG. 10 is a graph used to describe a method of selecting a misfire detection process according to the second embodiment. FIG. 10 shows the same relation as FIG. 4B. A specific frequency value fth in FIG. 10 corresponds to the value of the frequency f when the rotation fluctuation index value (more specifically, gain of the transfer function) on the MG side and the rotation fluctuation index value on the engine side intersect (i.e., when they become equal). In a low frequency band B1 lower than this specific frequency value fth, the rotation fluctuation on the MG side is more likely to occur than the rotation fluctuation on the engine side. On the other hand, in a high frequency band B2 higher than the frequency value fth, the rotation fluctuation on the engine side is more likely to occur than the rotation fluctuation on the MG side. Therefore, in order to achieve high misfire detectability in both the two frequency bands B1 and B2, it is favorable to use the rotation fluctuation on the MG side in the low frequency band B1 and to use the rotation fluctuation on the engine side in the high frequency band B2.

Accordingly, in the second embodiment, when the 0.5th order frequency value of the engine rotation frequency fne (i.e., the half frequency value of the engine rotation frequency fne) is equal to or less than the specific frequency value fth, the misfire detection process A described above is selected. On the other hand, when the 0.5th order frequency value is greater than the specific frequency value fth, a misfire detection process B is selected. This misfire detection process B is a process of detecting a misfire of the internal combustion engine 12 based on the rotation fluctuation of the crankshaft 12b detected by the crank angle sensor 34, which corresponds to an example of the "second misfire detection process" according to the present disclosure.

2-2. Process by Processor

Figure 11:
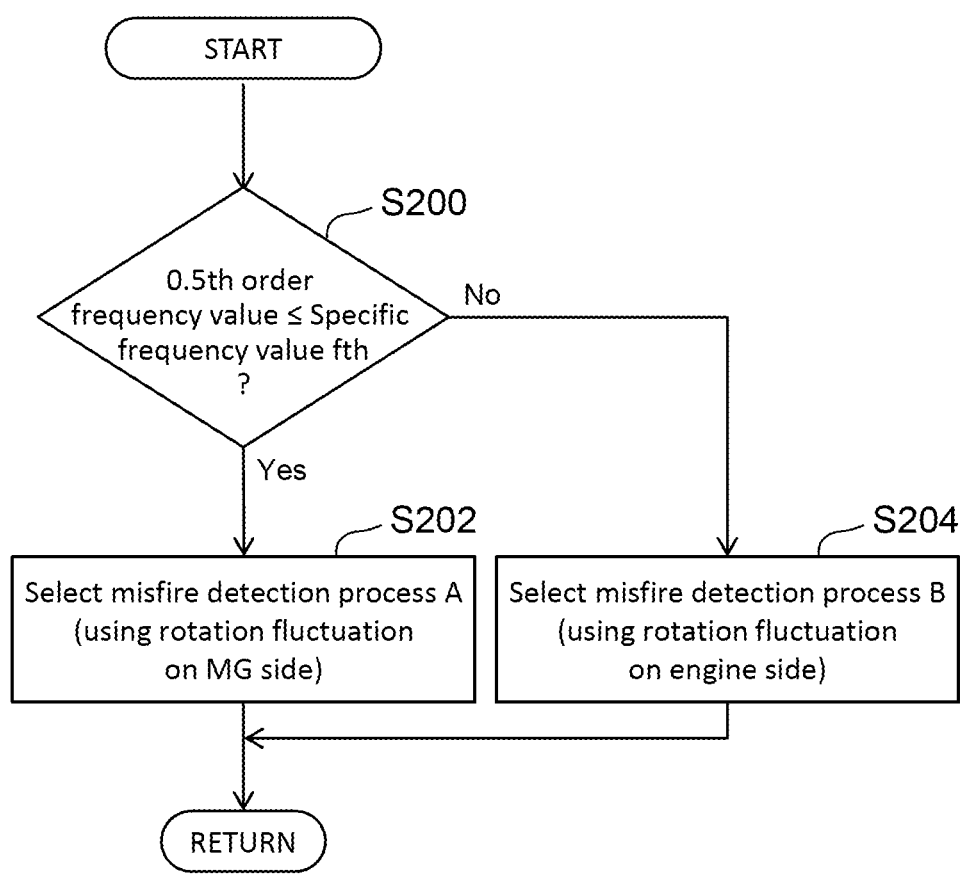
FIG. 11 is a flowchart showing the flow of the misfire detection process according to the second embodiment.

FIG. 11 is a flowchart showing the flow of the misfire detection process according to the second embodiment. The process of this flowchart is repeatedly executed during engine operation after the start of the internal combustion engine 12 is completed.

In FIG. 11, first, in step S200, the processor 22a determines whether or not the 0.5th order frequency value of the engine rotation frequency fne (i.e., the half frequency value of the engine rotation frequency fne) is equal to or less than the specific frequency value fth (see FIG. 10). The 0.5th order frequency value is calculated using the signal of the crank angle sensor 34.

In step S200, when the 0.5th order frequency value is equal to or less than the specific frequency value fth, the process proceeds to step S202. In step S202, the processor 22a selects the misfire detection process A using the rotation fluctuation on the MG side. Therefore, the processor 22a executes the process of the flowchart shown in FIG. 9.

On the other hand, in the step S200, when the 0.5th order frequency value is greater than the specific frequency value fth, the process proceeds to step S204. In step S204, the processor 22a selects the misfire detection process B that uses the rotation fluctuation on the engine side that is detected by the crank angle sensor 34. Specifically, the misfire detection process B can be realized by using any known method (for example, the method described in JP 2011-052698 A) as long as it is a method utilizing the rotation fluctuation on the engine side (i.e., the fluctuation of the engine speed Ne). Therefore, further detailed description of the misfire detection process B is omitted here.

2-3. Effect

According to the second embodiment described above, when the 0.5th order frequency value of the engine rotation frequency fne (i.e., the half frequency value of the engine rotation frequency fne) is equal to or less than the specific frequency value fth, the misfire detection process A that uses the rotation fluctuation on the MG side is selected, and when the 0.5th order frequency value is greater than the specific frequency value fth, the misfire detection process B that uses the rotation fluctuation on the engine side is selected. As a result, high misfire detectability can be achieved in both the two frequency bands B1 and B2 (see FIG. 10).

3. Other Embodiments (Other Examples of Engine Operating Conditions Using Misfire Detection Process A)

The misfire detection process A (first misfire detection process) using the rotation fluctuation on the MG side may be executed when the ignition timing is retarded with respect to the optimum ignition timing MBT for the catalyst warm-up or other purposes not only under the fast idle operating condition but also under other engine operating conditions in which the 0.5th order value (i.e., the half frequency value of the engine rotation frequency fne) is equal to or less than the specific frequency value fth (see FIG. 10).

Moreover, under the fast idle operating condition in a series hybrid electric vehicle having a small inertia Img, the 0.5th order frequency value (i.e., the half frequency value described above) belongs to the low frequency band B1 (see FIG. 10) regardless of the specifications of the series hybrid electric vehicle. The misfire detection process A may be executed during a fast idle operation that is not accompanied by the retard of the ignition timing with respect to the optimum ignition timing MBT for catalyst warm-up or other purposes.

(Example of Selecting Misfire Detection Process in Accordance with Inertia Ratio R)

When the rotating elements on the MG side have a gear ratio, the inertia Img on the MG side is affected by the gear ratio (more specifically, the square of the gear ratio). Therefore, in a power train system configured such that the gear ratio can be changed, during the operation of the internal combustion engine 12, the inertia Img changes in association with the change of the gear ratio, and the inertia ratio R (see FIG. 2) also changes. As a result, whether it is appropriate to use the rotation fluctuation on the MG side or the rotation fluctuation on the engine side for misfire detection may differ depending on whether the inertia ratio R is lower or higher than the designated value R1 (see FIG. 2) during the operation of the internal combustion engine 12. Accordingly, in the series hybrid electric vehicle including the power train system having this kind of configuration, the processor of the engine misfire detection device may be configured to calculate the inertia ratio R during the operation of the internal combustion engine. Then, the processor may select the misfire detection process A (first misfire detection process) when the inertia ratio R is equal to or less than the designated value R1, and may select the misfire detection process B (second misfire detection process) when the inertia ratio R is higher than the designated value R1.

What is claimed is:

1. An engine misfire detection device mounted on a hybrid electric vehicle that includes: an internal combustion engine having a plurality of cylinders and a crankshaft and dedicated to power generation; and a generator having a generator rotating shaft connected to the crankshaft via a torsional damper, the engine misfire detection device comprising:
   a generator rotation angle sensor configured to detect a rotation angle of the generator rotating shaft; and
   a processor configured to execute a misfire detection process of detecting a misfire of the internal combustion engine,
   wherein the misfire detection process includes a first misfire detection process of determining that the internal combustion engine has misfired when an amplitude correlation value that correlates with a magnitude of amplitude of rotation speed of the generator rotating shaft and is detected by the generator rotation angle sensor is greater than a determination threshold value, and the amplitude correlation value is a magnitude of one of a total amplitude or a half amplitude of the rotation speed of the generator rotating shaft.

2. The engine misfire detection device according to claim 1, further comprising a crank angle sensor, wherein
   the misfire detection process includes a second misfire detection process of detecting a misfire of the internal combustion engine based on a rotation fluctuation of the crankshaft detected by the crank angle sensor,
   the processor is configured to:
   select the first misfire detection process when a half frequency value of engine rotation frequency associated with rotation speed of the crankshaft detected by the crank angle sensor is equal to or less than a specific frequency value; and
   select the second misfire detection process when the half frequency value is greater than the specific frequency value,
   the specific frequency value is a value of frequency when a gain of a transfer function being a ratio of rotation angle displacement of the crankshaft to torque of the internal combustion engine is equal to a gain of a transfer function being a ratio of rotation angle displacement of the generator rotating shaft to the torque of the internal combustion engine.

3. The engine misfire detection device according to claim 2, wherein
   the processor is configured to select the first misfire detection process in an engine operating condition in which the half frequency value is equal to or less than the specific frequency value and an ignition timing of the internal combustion engine is retarded from an optimum ignition timing.

4. The engine misfire detection device according to claim 1, wherein
   the processor is configured to execute the first misfire detection process during a fast idle operation immediately after a cold start of the internal combustion engine.

* * * * *